Nov. 10, 1953  C. J. ALDINO ET AL  2,658,259
APPARATUS FOR FINISHING GEARS
Filed July 3, 1950  2 Sheets-Sheet 1
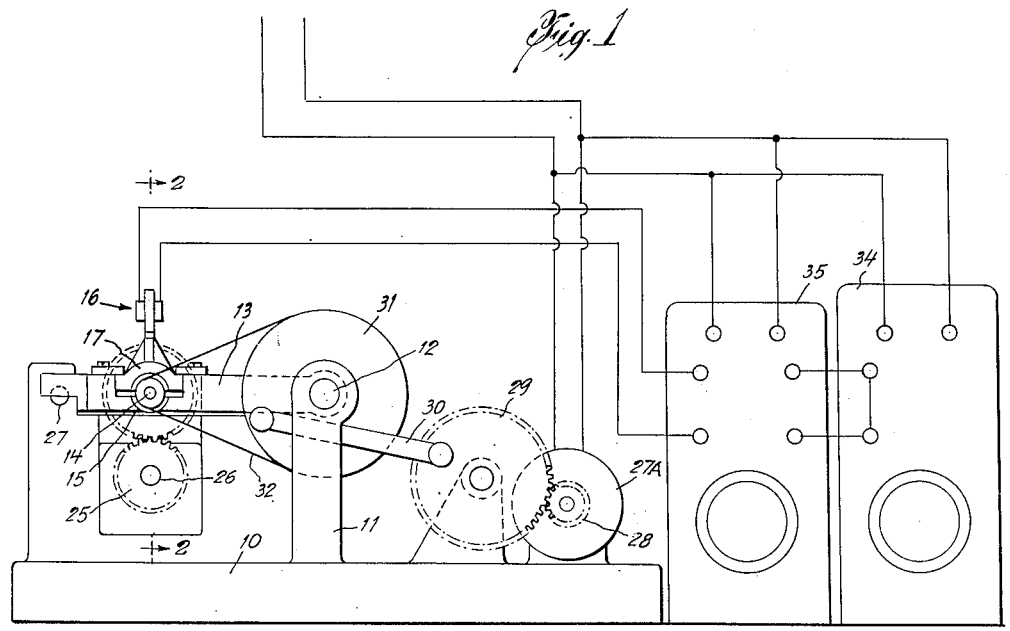
Fig. 1
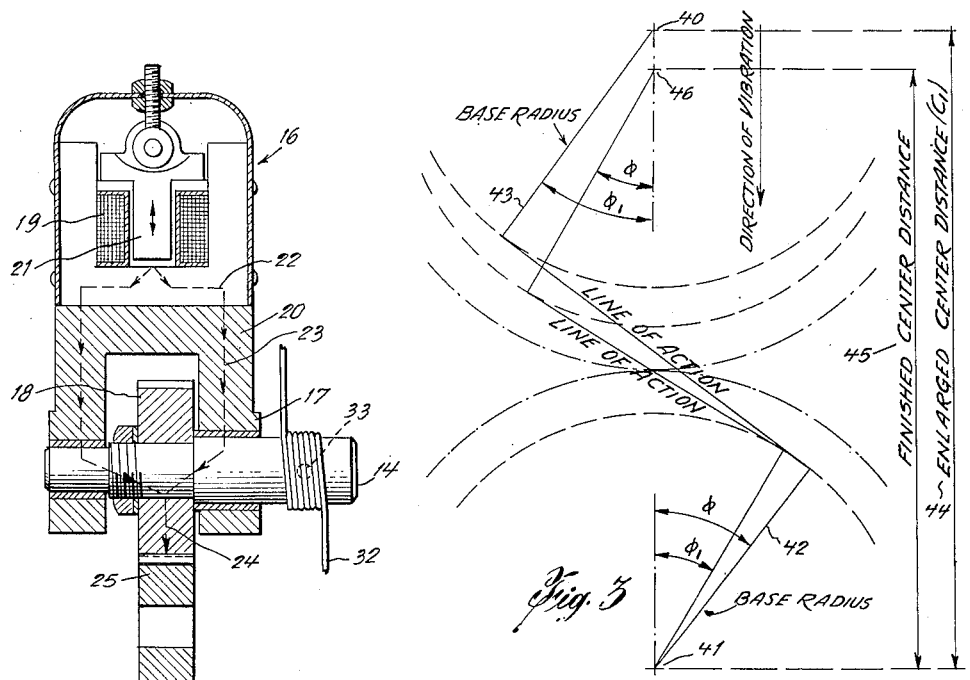
Fig. 2
Fig. 3
INVENTORS
CHARLES J. ALDINO
JOHN J. RYAN
BY
Pollard & Johnston
ATTORNEYS

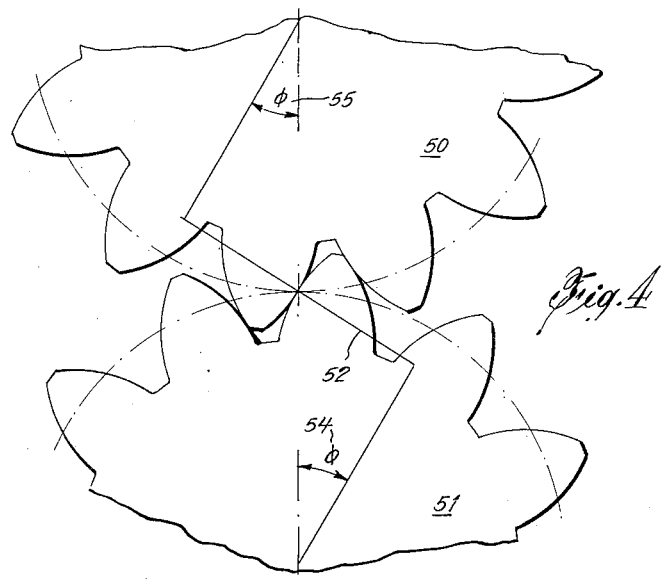
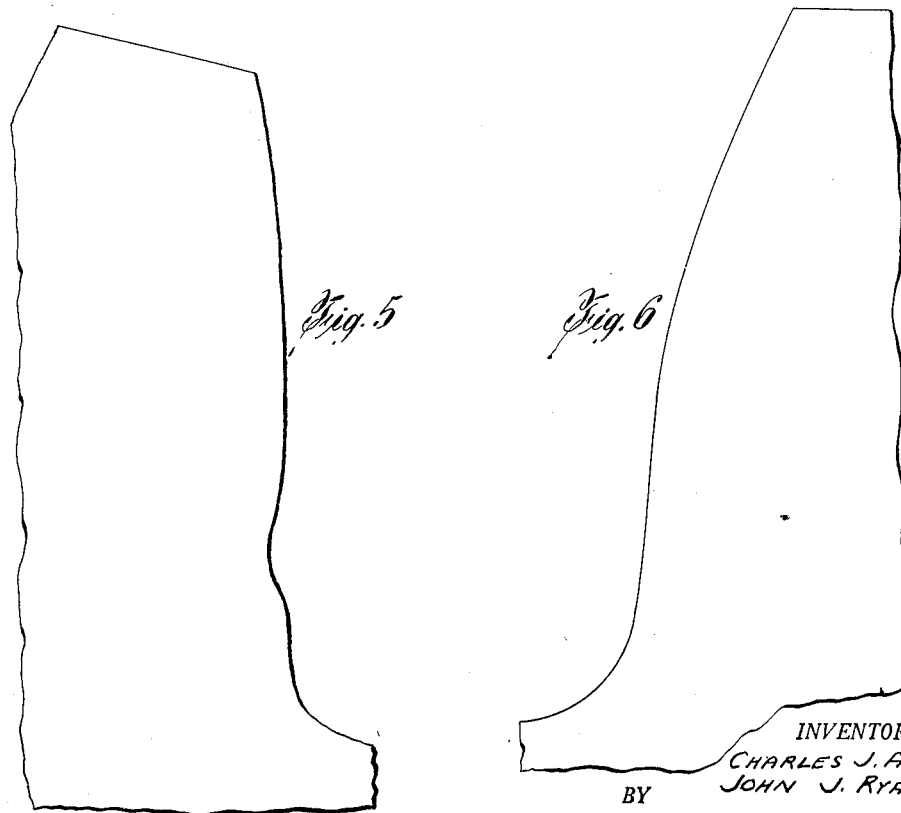

Patented Nov. 10, 1953

2,658,259

UNITED STATES PATENT OFFICE 2,658,259

APPARATUS FOR FINISHING GEARS

Charles J. Aldino, Franklin Square, and John J. Ryan, New York, N. Y.

Application July 3, 1950, Serial No. 171,906

6 Claims. (Cl. 29—90)

This invention relates to gear finishing and particularly to a machine and process for finishing gears of improved accuracy, smoothness and strength, especially to all types of involute gears.

Various methods can be employed for forming gears, for example, they can be made by conventional cutting, hobbing, or by other gear shaping methods. In all of these processes, difficulty is encountered in obtaining accurate tooth profiles, spacing, concentricity, tooth thickness, etc., with consequent limitations on the accuracy of the mesh obtainable with said gears. This is particularly of importance when accurate gears are required for precision work.

One of the objects of the invention is to provide an apparatus and method of finishing gears to improved accuracy, strength and wear characteristics.

Gears made in accordance with the invention described herein can be finished in production to greater accuracy with respect to the tooth profiles, spacing, concentricity, tooth thickness, etc., than prior known production quantity gears. They also will have improved surfaces and wear characteristics over the active portion of the tooth profiles. These surfaces will be relatively free of tool marks and at least to some extent material imperfection in these areas will be eliminated.

In one aspect of the invention, a master or finishing gear is held in contact with the gear to be made, said gear being oversize or having a predetermined excess of material on its tooth surfaces to be finished. The master gear preferably is suitably hardened and has the desired tooth characteristics. When helical, spur, or worm gears are to be finished, the two gears are placed in mesh with each other and are rotated through a series of cycles while they are subjected to linear vibrations of controlled amplitude and frequency. The vibratory force preferably is exerted perpendicular to the plane tangent to both pitch surfaces at their point of mesh. It can be theorized that the vibration produces a surface compressing action by transmitted impact acting at a number of points equal to the vibrator frequency multiplied by the time during which the process is applied multiplied by the contact ratio for the work gear and master gear used divided by the number of teeth for each active profile of each tooth in the work gear. A resilient force is provided to hold the gears in the continuous intimate mesh which is necessary to insure accurate relative angular velocity to provide control of profile accuracy. As the tooth surfaces of the work gear are compressed, the center distance between the gears decreases until a stop is reached which limits movement together and establishes the finished pitch diameter, tooth thickness, and concentricity of the work gear.

The machine for carrying out the invention can take various forms. One form may have arrangements for holding the gears in contact with each other in a predetermined relationship and for suitably rotating the master or finishing gear at the same time that a vibratory impact is employed, the gears being rotated relative to each other.

The process, through variation and adaptation in the design of the machine, may be applied to all types of gearing based on the involute system.

In the case of spur, helical, or internal gears, it is conceivable that an oscillation of either the work gear or finishing gear along its axis during the vibratory process may produce improvements in the results with respect to accuracy of the finished part and working life of the finishing gear.

These and other objects, advantages and features of the invention will become apparent from the following description and drawing.

Figure 1 is a side view of one type of machine for carrying out the invention.

Figure 2 is an enlarged sectional view taken along the line 2—2 of Figure 1.

Figure 3 illustrates the relationships involved between the elements.

Figure 4 is a further illustration of the relationships of the gears.

Figure 5 is an enlarged profile of a tooth finished by conventional processes.

Figure 6 is an enlarged profile of a tooth finished in accordance with the invention, the figure having been made from a photograph.

As mentioned, various machines can be employed for carrying out the invention, one form of which will be described hereafter. Frame 10 can have an upright 11 carrying shaft 12. A carrier arm 13 can be mounted on shaft 12, said carrier arm supporting the finishing gear shaft 14. Finishing gear shaft 14 is carried in lower bearing 15 in the arm 13 and can have a vibrating mechanism 16 attached to the upper half 17 of the bearing. Bearing 17 can be separable relative to the lower bearing so as to permit the desired vibration of finishing or master gear 18.

As previously mentioned, finishing gear 18 is a hardened, accurately made gear of suitable material, such as an alloy steel.

Vibrating element 16 (Figs. 1 and 2) may comprise a solenoid 19 and a vibrator armature and hammer 21 suitably held in frame 20. Frame 20 is attached to the upper part of bearing 17. Impact vibrations are developed by hammer 21 of the vibrator and transmitted as indicated by arrows 22, 23 and 24 through finishing gear 18 to the work gear 25 which is being finished. Work gear 25 is carried on gear shaft 26 suitably mounted in the frame 10. A limit stop 27 (Fig. 1) is employed to limit the movement of the finishing gear relative to the work gear by controlling downward movement of arm 13.

Reversible rotary motion can be transmitted from motor 27A through gears 28, 29, link 30, and drum or pulley 31. Belt 32, which may be of flexible wire, is carried by pulley 31 and is wrapped a plurality of times around finishing gear shaft 14, it being fastened thereto at its center 33. Thus, the motor will rotate the elements so as to suitably reversibly turn the gears relative to each other. The distance of the link pin on gear 29 from the center of the gear is such relative to the distance of the link pin on pulley 31 from the center of the pulley that one full revolution of gear 29 will cause pulley 31 to rotate through an angle of 90°, reverse and return to its original position. The ratio between the diameter of pulley 31 and the diameter of finishing gear shaft 14 can be made so as to provide the desired number of turns in each direction for each cycle.

A suitable electronic oscillator 34 is connected through amplifier 35 to vibrator 16 so as to provide the desired vibrations of the hammer 21. Merely by way of example, these vibrations can be in the range of 120 cycles per second. Frequencies as high as 1200 per second would be more efficient in the fine pitch field, i. e. 24 to 100 diametral pitch and finer. Lower frequencies and heavier vibrator impact would be suitable for coarse pitches. It should be remembered that each type of gear being worked would have an ideal frequency and amplitude combination as determined by material, pitch, contact ratio, face width, number of teeth, etc. By an ideal ratio is meant the one with which the gear will be finished to the greatest possible accuracy in the shortest possible time.

The work gear should be oversize, an amount equal to the inaccuracy which is inherent in its method of manufacture, in order that it may be completely finished without working below the specified finished size. The oversize dimensions should be as close as is economically possible to the finished size while conforming to the above requirements, in order that less work will be required for finishing with a proportional reduction in time and cost of the finishing process.

As a result of the finishing process herein, it has been possible consistently to make gears having a composite tooth error below that specified in the tolerance standards. Total composite error is the cumulative result of runout, tooth spacing errors, tooth thickness variations, profile error, and lateral runout. The tolerance standards specified are those listed by the A. G. M. A.

Referring to Figure 3, the master gear center at the beginning of the operation is illustrated at 40, the center of the work gear being fixed at 41. The base radius for the work gear is shown at 42 and the base radius for the master or finishing gear at 43. The distance between centers at time of start is 44 and at time of finish is 45, there being a stop to positively limit the movement of the gears toward each other during the vibratory action. The center of the finishing gear at completion of the process is indicated at 46.

The basic pressure angle $\phi$ remains the same since intimate contact is maintained during the process of vibrating and the resulting action is conjugate. This is further illustrated in Figure 4 wherein the finishing gear 50 is shown in contact with the work gear 51, the line of action being seen at 52 and the base pressure angle $\phi$ at 54, 55. The basic pressure angle of an involute gear is determined by the basic rack tooth form from which the involute portion of the tooth form is developed. It establishes the ratio between the lengths respectively of the base radius and the basic pitch radius. The basic pitch radius is the radius on which the gear will roll when meshed with a rack of like pitch and pressure angle. This radius is constant even though the gear teeth are cut oversize since the rack tooth form is straight sided and the point of tangency is at the same angle as the side of the rack tooth which is equal to the basic pressure angle. It must be remembered that when two gears are in mesh, two centers of rotation are involved and when one gear has oversized teeth the center distance will be greater causing the point of tangency to be higher on the involute form resulting in a modification of the pitch radius and pressure angle known as the working pitch radius and pressure angle $\phi_1$, respectively. As the oversize teeth are reduced, the working pressure angle and working pitch radius are reduced but the basic pressure angle and the basic pitch radius remain constant as do the base radii.

As mentioned, it is necessary that accurate stops be provided so as to prevent working of the two surfaces past the exact pitch line dimension. Also, the frequency and amplitude of the impacts should be controlled in accordance with the materials, pitches, and face widths of the gears being processed. The gears should be rotated in both directions during the process. Also, the finishing or master gears should have a prime number of teeth whenever possible for maximum effectiveness of the method. By using master gears with prime numbers of teeth, it is assured that with the exception of work gears with an equal number of teeth, or multiples thereof, every high point which is due to inaccuracy in the master gear will work the whole active profile of every tooth in the work gear. Thus, the accuracy of the finished part is not limited by the inaccuracy of the master.

Further, the process could be applied to spur, helical and spiral gears by using a master worm and generating across the gear face as is done in a hobbing machine. In the case of throated worm wheels, the worm would not be traversed, but held on the center line of the throat radius. The worm could not be moved across the face of the throated worm wheel because it would be restrained by the curvature of its seat in the worm wheel. The worm and throated worm wheel would be finished in the same manner as spur gears with the exception that the axis would be at right angles to each other.

In the case of hobbed gears, notch sensitivity of the fillets of the gear teeth may be reduced by using a master rack having the same nominal tooth proportion as the hob with which the gears were cut. In this way, the entire tooth surface will be finished and tooth racks, surface imperfections and notches removed.

Where "Fellows" shaping methods are employed, the same result can be obtained by using a master gear having the same number of teeth and nominal tooth proportions as the cutter with which the gear was shaped. Gears cut by the "Fellows" process do not have the same form below the active involute profile as hobbed gears, therefore the masters used to finish the root and fillets would not be interchangeable with those used for hobbed gears.

In Figure 5, an enlarged profile is shown of a gear cut by conventional methods, and it is seen that there are irregularities therein, particularly near the base. The base defects are notch-like in character and tend toward impact or notch failures. Figure 6 was taken from an enlarged photograph of gears finished according to the invention herein, and it was found that the faces were relatively smooth and did not have the indentations and notch defects of Figure 5.

In a further aspect of the invention, crowning of spur or helical gear teeth can be accomplished by using a master gear or rack where the teeth are slightly thicker at the ends as compared to the center. Also, the same result could be obtained by adding a slight rocking motion to the axis of either the finishing gear or rack or the work gear during the process. It is also contemplated that cam surface could be finished in a similar manner.

The process can be applied to toothed racks as well as to all the various types of gears mentioned, and the term "gear" in the claims is intended to include such racks. The vibratory force can be applied to the work gear instead of the finishing gear. Various types of mechanical vibrators can be used as well as electrical vibrators.

In order to carry out the invention, the teeth should be kept in intimate contact, there being no perceptible motion therebetween, impact forces being transmitted through the gears at their contact line or point. Continuous intimate contact between gears means that there will be continuous contact on both sides of at least one tooth or space when engaged.

It should be apparent that variations can be made in the details of construction without departing from the spirit of the invention except as defined in the appended claims.

We claim:

1. In a machine for finishing gears, the combination comprising a finishing gear holding means, a work gear holding means, means rotating gears on said gear holding means, means holding said gears in continuous intimate contact, and high frequency electrically actuated means subjecting said gears to impact action.

2. In a machine for finishing gears, the combination comprising a finishing gear support in which a finishing gear can be rotatably held, a work gear support in which a gear to be finished initially having oversize teeth can be rotatably held, means holding said gears in continuous intimate contact as they are rotated, and means imparting impact force to said gears, so as to finish the work gear by compressive action on the tooth surfaces.

3. In a machine for finishing gears, the combination comprising a finishing gear support in which a finishing gear can be rotatably held, a work gear support in which a gear to be finished initially having oversize teeth can be rotatably held, means holding said gears in continuous intimate contact as they are rotated, means imparting impact from linear vibrations to said gears, and means limiting their movement toward each other to the correct finished distance between centers for the particular pressure angle involved, so as to finish the work gear by compressive action on the tooth surfaces thereof.

4. In a machine for finishing gears, the combination comprising a finishing gear support in which a finishing gear can be rotatably held, a work gear support in which a gear to be finished initially having oversize teeth can be rotatably held, means holding said gears in continuous intimate contact as they are rotated, a solenoid, and an armature operable by said solenoid connected to one of said supports, so as to impart impact from vibrations to said gears as they are held in intimate contact.

5. In a machine for finishing gears, the combination comprising a finishing gear support in which a finishing gear can be rotatably held, a work gear support in which a gear to be finished initially having oversize teeth can be rotatably held, means holding said gears in continuous intimate contact as they are rotated, a solenoid, an armature operable by said solenoid connected to one of said supports, and a source of varying current connected to said solenoid, so as to impart vibrations to said armature and impacts to said gears as they are held in intimate contact.

6. In a machine for finishing gears, the combination comprising a finishing gear support in which a finishing gear can be rotatably held, a work gear support in which a gear to be finished initially having oversize teeth can be rotatably held, means holding said gears in continuous intimate contact as they are rotated, and means imparting linear impacts to said gears perpendicular to a plane tangent to both pitch surfaces at their point of mesh, so as to finish the work gear by compressive action on the tooth surfaces.

CHARLES J. ALDINO.
JOHN J. RYAN.

References Cited in the file of this patent

UNITED STATES PATENTS

| Number | Name | Date |
|---|---|---|
| 509,705 | Threlfall | Nov. 28, 1893 |
| 618,978 | Beale | Feb. 7, 1899 |
| 1,154,830 | Alquist | Sept. 28, 1915 |
| 1,651,306 | Weyandt | Nov. 29, 1927 |
| 1,784,282 | Gibson | Dec. 9, 1930 |
| 2,070,944 | Hillix | Feb. 16, 1937 |
| 2,313,221 | Campbell | Mar. 9, 1943 |
| 2,405,159 | Miller | Aug. 6, 1946 |
| 2,445,649 | Turner et al. | July 20, 1948 |
| 2,452,211 | Rosenthal | Oct. 26, 1948 |
| 2,468,052 | Fisher | Apr. 26, 1949 |